United States Patent Office 3,036,651
Patented May 29, 1962

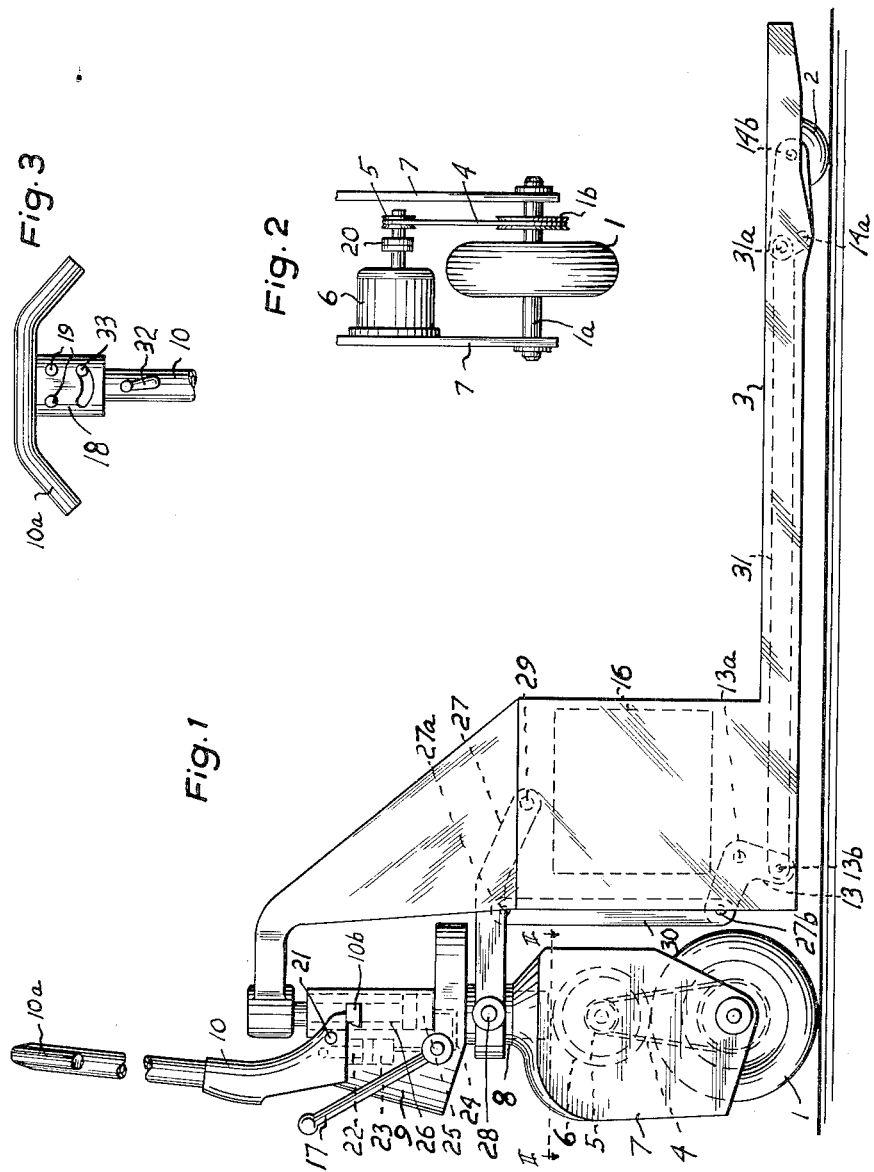

3,036,651
TRANSPORT VEHICLE
Adolf Paul, Asternstrasse 28, and Kurt Steinert, Anton-Nagel-Strasse 25, both of Moosburg, Germany
Filed Jan. 28, 1959, Ser. No. 819,811
Claims priority, application Germany Jan. 29, 1958
4 Claims. (Cl. 180—19)

Transport vehicles constructed to undergo a lifting movement and adapted for carrying loads are provided either with a hand-drive or a motor-drive. With the use of the hand-drive alone, a single operator is by far insufficient, particularly when the roadway is bad or grades have to be climbed. The motor-driven machine, on the other hand, has the disadvantage that when the battery which provides its power has become discharged, the vehicle can no longer be operated. The hand-moving of a motor-driven vehicle is unusually hard, because not only is the battery heavy, but there is also the coupling between the motor and the driving-wheel or sprocket.

The foregoing holds true not only for the driving of the vehicle but also for the actuation of the lifting movements of the vehicle.

It is an object of the invention to provide a transport vehicle which avoids the disadvantages and drawbacks indicated above.

In accordance with the present invention, there is provided a transport vehicle provided with means for hand-propulsion, e.g. a traction lever, and also provided with an electric motor, and a battery which has a capacity which, under normal conditions, is insufficient for continuous driving such a vehicle not provided with hand-driving means, a clutch between the electric motor and the driving-gear also being provided.

The invention will now be described in detail with reference to the accompanying drawing which shows an illustrative embodiment of a transport vehicle in accordance with the invention, and wherein, FIG. 1 is a side elevational view of a vehicle embodying features of the present invention;

FIG. 2 is a cross-sectional view taken approximately along line II—II of FIG. 1; and FIG. 3 is a fragmentary elevational view of the upper end of the traction lever.

Referring to the drawing, the transport vehicle illustrated has a single central forward wheel 1 and two co-axial rear wheels 2. Mounted between and supported by the wheels 1 and 2, is the raisable and lowerable frame 3. Driving wheel 1 is mounted on a shaft 1a carrying a pulley 1b engaged by a belt 4 which in turn engages pulley 5 mounted on the shaft of the motor 6, with a clutch 20 being provided between the motor and the pulley 5. The assembly consisting of the wheel 1 and its shaft 1a, the belt 4, the motor 6, and the clutch 20, is mounted in a casing unit 7 which in turn is rigidly connected to an extension 8 of a swingable body 9. Body 9 has pivotally connected to it about a pivot 21 a lever 10 provided at its upper end with a handle unit 10a. Interiorly, body 9 is formed with a fluid cylinder 23 which receives a piston 22, and with a parallel fluid cylinder 25 which receives a piston 26, a fluid line 24 interconnecting the lower ends of cylinders 23 and 25. Piston 22 is articulated to the lever 10 so that, on counter-clockwise rotation of this lever as seen in FIG. 1, piston 22 is depressed into cylinder 23 and forces fluid, e.g. oil, into cylinder 25 through line 24. Thus, pistons 22 and 26 define a fluid pump. Piston 26 is connected directly to frame 3 and thus, when piston 22 is depressed, piston 26 is raised and the frame 3 is concurrently raised. Clockwise rotation of lever 10 is limited by a stop 10b.

Arms 27 (only one being shown in FIG. 1) are disposed on opposite sides of extension 8 and are articulated to a collar carried by it so that extension 8 may be rotated by handle 10 to steer the vehicle. The other end of each arm 27 is articulated to frame 3 by means of a flexible connection indicated at 29. To each arm 27 is articulated at 27a a link or push rod 30 which in turn is articulated at 27b to a lever 13 in the nature of a bell-crank pivotally connected at 13a to frame 3. Each lever 13 is pivotally connected at 13b to a link or push rod 31 which in turn is pivotally connected at 31a to a rear lever 14 pivotally mounted at 14a in frame 3 and carrying the axle 14b of wheels 2. When the frame 3 is raised by the action of piston 26, the levers 13 are correspondingly raised and the links 30 are also raised, but to a lesser extent, so that they are in effect lowered with respect to the levers 13, and the links 31 are moved rearwardly, causing the wheels 2 to be swung out to correspond with the elevation of the frame 3.

A battery 16 is mounted on the frame 3 behind the casing 7 and this battery is of a lower capacity than that which would be required if the vehicle were solely to be power driven by a motor fed by the battery. The capacity of the battery 16 is such that it can be used to drive the vehicle when the road is rough or contains uphill stretches, and the like, and when so used it is effective to operate for as long as conventional batteries used for complete drive, e.g. 6 to 7 hours.

The body 9 is also provided with a lever 17 which is connected to a valve (not shown) in fluid line 24 by means of which the line 24 may be closed to prevent return of fluid to cylinder 23 even when handle 10 is returned to its rest position shown in FIG. 1. The frame 3 may then be lowered by actuating lever 17 to open the valve.

The upper end of handle 10 has a head 18 which is provided with press buttons 19 which are connected to motor 6, which is of the reversible type, and are employed to cause the vehicle to be driven forwardly or rearwardly by appropriate actuation of motor 6. The handle 10 is also provided with a lever 32 which is connected to the clutch 20 by any convenient mechanical connection (not illustrated) for engaging or disengaging the clutch. Additionally, a switch 33 is provided in handle 10 for the purpose of starting, and for such use it is suitably connected to the electric motor.

It will be understood that the vehicle does not have to be constructed to provide for a raising and lowering movement as well as for both hand drive and motor drive and it may merely be constructed to provide for hand drive and motor drive.

Since the battery 16 is only an auxiliary or helping battery which is not used for constant drive of the vehicle, but only for occasional emergency drive, the battery can be very light, thus the vehicle is also relatively light and easily hand driven.

To prepare the vehicle for hand drive after a period of motor drive, it is merely necessary to disengage the clutch 20. The vehicle of the invention, therefore, notwithstanding the effective provision of motor-drive means, has the general advantageous features of a vehicle adapted solely for hand drive but with its disadvantages.

It will be understood that various changes and modifications may be made in the embodiment described above and illustrated in the drawing without departing from the invention as defined in the appended claims and it is intended, therefore, that all matter contained in the foregoing description and in the drawing shall be interpreted as illustrative only and not as limitative of the invention.

What we claim and desire to secure by Letters Patent is:
1. A transport vehicle adapted for hand drive by a person walking beside the vehicle and for taking up loads comprising, in combination, a chassis mounted upon wheels, including a forward steering wheel, motorized drive means including drive gearing connected to said steering wheel to propel the vehicle, a clutch between the drive gearing and the motor, fluid pump means at the forward end of said vehicle for raising and lowering the entire chassis in relation to said wheels, and steering handle means pivoted at the forward end of said vehicle for actuating said fluid pump, said forward steering wheel, said drive means, said clutch, said fluid pump means, and said steering handle means being contained in an assembly pivoted to the remainder of the chassis at the forward end thereof on a vertical pivoting axis, whereby said vehicle is steered by actuating said steering handle means to pivot said assembly, and said fluid pump means is actuated to raise said chassis upon pivoting movement of said handle means from an upper rest position to a lower operative position.

2. A transport vehicle adapted for hand drive by a person walking beside the vehicle and for taking up loads comprising, in combination, a chassis mounted upon wheels, including a forward steering wheel, motorized drive means including drive gearing connected to said steering wheel to propel the vehicle, a clutch between the drive gearing and the motor, fluid pump means at the forward end of said vehicle for raising and lowering the entire chassis in relation to said wheels, and steering handle means pivoted at the forward end of said vehicle for actuating said fluid pump, said forward steering wheel, said drive means, said clutch, said fluid pump means, and said steering handle means being contained in an assembly pivoted to the remainder of the chassis at the forward end thereof on a vertical pivoting axis, whereby said vehicle is steered by actuating said steering handle means to pivot said assembly, and said fluid pump means is actuated to raise said chassis upon pivoting movement of said handle means from an upper rest position to a lower operative position, the wheels other than the steering wheel being connected to said chassis for pivoting movement upon raising of said chassis by actuation of said fluid pump means in response to the movements of said steering handle means.

3. A transport vehicle adapted for hand drive by a person walking beside the vehicle and for taking up loads comprising, in combination, a chassis mounted upon wheels, including a forward steering wheel, motorized drive means including drive gearing connected to said steering wheel to propel the vehicle, battery means carried by said chassis for supplying the motorized drive means, a clutch between the drive gearing and the motor, fluid pump means at the forward end of said vehicle for raising and lowering the entire chassis in relation to said wheels, and steering handle means pivoted at the forward end of said vehicle for actuating said fluid pump, said steering handle means being provided with actuating means for selective engagement and disengagement of said clutch, said forward steering wheel, said drive means, said clutch, said fluid pump means, and said steering handle means being contained in an assembly pivoted to the remainder of the chassis at the forward end thereof on a vertical pivoting axis, whereby said vehicle is steered by actuating said steering handle. means to pivot said assembly, and said fluid pump means is actuated to raise said chassis upon pivoting movement of said handle means from an upper rest position to a lower operative position.

4. A transport vehicle adapted for hand drive by a person walking beside the vehicle and for taking up loads comprising, in combination, a chassis mounted upon wheels, including a forward steering wheel, motorized drive means including drive gearing connected to said steering wheel to propel the vehicle, battery means carried by said chassis for supplying the motorized drive means, a clutch between the drive gearing and the motor, fluid pump means at the forward end of said vehicle for raising and lowering the entire chassis in relation to said wheels, and steering handle means pivoted at the forward end of said vehicle for actuating said fluid pump, said steering handle means being provided with actuating means for selective engagement and disengagement of said clutch, said forward steering wheel, said drive means, said clutch, said fluid pump means, and said steering handle means being contained in an assembly pivoted to the remainder of the chassis at the forward end thereof on a vertical pivoting axis, whereby said vehicle is steered by actuating said steering handle means to pivot said assembly, and said fluid pump means is actuated to raise said chassis upon pivoting movement of said handle means from an upper rest position to a lower operative position.

References Cited in the file of this patent

UNITED STATES PATENTS

| | | |
|---|---|---|
| 2,507,357 | Stoner | May 9, 1950 |
| 2,635,711 | Turner | Apr. 21, 1953 |
| 2,643,740 | Quayle | June 30, 1953 |
| 2,693,290 | Elliott et al. | Nov. 2, 1954 |
| 2,772,797 | Schreck | Dec. 4, 1956 |
| 2,789,648 | Huffman | Apr. 23, 1957 |
| 2,796,186 | Arnot | June 18, 1957 |
| 2,942,679 | Gibson | June 28, 1960 |